United States Patent [19]
Kato et al.

[11] Patent Number: 5,587,638
[45] Date of Patent: Dec. 24, 1996

[54] FLEXIBLE SERVO CONTROL METHOD CAPABLE OF SPECIFYING FLEXIBILITY ON WORKING COORDINATES

[75] Inventors: Tetsuaki Kato, Hadano; Soichi Arita; Masaru Nakamura, both of Oshino-mura, all of Japan

[73] Assignee: Fanuc Ltd., Minamitsuru-gun, Japan

[21] Appl. No.: 392,790

[22] PCT Filed: Jun. 23, 1994

[86] PCT No.: PCT/JP94/01012

§ 371 Date: Feb. 28, 1995

§ 102(e) Date: Feb. 28, 1995

[87] PCT Pub. No.: WO95/02214

PCT Pub. Date: Jan. 19, 1995

[30] Foreign Application Priority Data

Jul. 5, 1993 [JP] Japan .................................. 5-191962

[51] Int. Cl.$^6$ .................................................... G05B 19/42
[52] U.S. Cl. ............................ 318/568.14; 318/568.22; 364/474.22
[58] Field of Search .................... 318/568.14, 568.19, 318/568.22; 364/474.22, 157

[56] References Cited

U.S. PATENT DOCUMENTS

| | | | |
|---|---|---|---|
| 4,367,532 | 1/1983 | Crum et al. | 318/568.14 X |
| 4,408,286 | 10/1983 | Kikuchi et al. | 318/568.14 X |
| 4,737,697 | 4/1988 | Maruo et al. | 318/568.14 X |

FOREIGN PATENT DOCUMENTS

| | | |
|---|---|---|
| 56-33704 | 4/1981 | Japan . |
| 59-81094 | 5/1984 | Japan . |
| 60-75904 | 4/1985 | Japan . |
| 63-68390 | 3/1988 | Japan . |
| 63-145512 | 6/1988 | Japan . |
| 63-149707 | 6/1988 | Japan . |

*Primary Examiner*—Brian Sircus
*Attorney, Agent, or Firm*—Staas & Halsey

[57] ABSTRACT

A control method for a servomotor which is controlled by a control system with a position control loop and a speed control loop, such that a degree of flexibility specified on working coordinates, on which the servomotor is situated, is converted into servo gains Kp and Kv for individual axes of the servomotor, and the servomotor is driven according to the converted servo gains Kp and Kv, whereby the degree of flexibility can be set on the working coordinates, and a driven body can be moved manually.

4 Claims, 4 Drawing Sheets

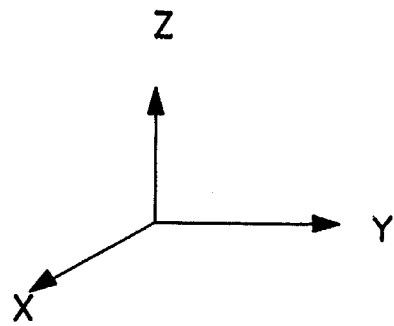

$$K_X \quad (x_{cod} - x_{fb}) = F_X$$
$$K_Y \quad (y_{cod} - y_{fb}) = F_Y$$
$$K_Z \quad (z_{cod} - z_{fb}) = F_Z$$
$$K_{MX} \quad (\Theta_{xcod} - \Theta_{xfb}) = M_X$$
$$K_{MY} \quad (\Theta_{ycod} - \Theta_{yfb}) = M_Y$$
$$K_{MZ} \quad (\Theta_{zcod} - \Theta_{zfb}) = M_Z$$

FIG. 4A

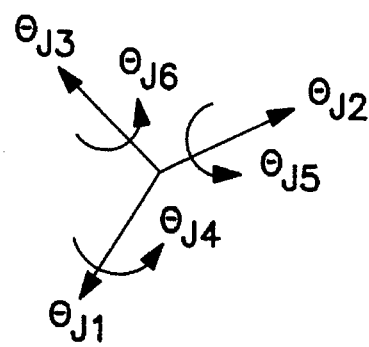

$$K_{J1} (\Theta_{J1cod} - \Theta_{J1fb}) = T_{J1}$$
$$K_{J2} (\Theta_{J2cod} - \Theta_{J2fb}) = T_{J2}$$
$$K_{J3} (\Theta_{J3cod} - \Theta_{J3fb}) = T_{J3}$$
$$K_{J4} (\Theta_{J4cod} - \Theta_{J4fb}) = T_{J4}$$
$$K_{J5} (\Theta_{J5cod} - \Theta_{J5fb}) = T_{J5}$$
$$K_{J6} (\Theta_{J6cod} - \Theta_{J6fb}) = T_{J6}$$

FIG. 4B 5,587,638

FLEXIBLE SERVO CONTROL METHOD CAPABLE OF SPECIFYING FLEXIBILITY ON WORKING COORDINATES

TECHNICAL FIELD

The present invention relates to the control of the servomotor for driving a robot arm or the like, and to a servocontrol method using position and speed control loops for position control, and more particularly, to a servocontrol method capable of specifying the degree of flexibility with respect to the working coordinates.

BACKGROUND ART

In controlling an arm of a robot or the like, a servomotor for driving the arm is controlled by controlling its position through position and speed control loops. If the servomotor is controlled in the control system of this type, the driven body, such as the robot arm, moving toward a position specified by a position command continues to move directly toward the target position without avoiding an obstacle, if any, in its course. For another example, when mounting a workpiece on a machine tool using an arm of a robot, if the accuracy of the workpiece is not good enough, there will be some disagreement between the actual position of the workpiece and the commanded position, and the workpiece cannot be mounted on the machine tool. In such a case, moreover, it is difficult to move the workpiece to a mounting position of the machine tool by manually moving the robot arm.

There is proposed a flexible servocontrol method for solving these problems, in which a driven body can be manually moved to avoid an obstacle. FIG. 5 is a block diagram of a servo system used in the conventional flexible servocontrol method. Referring to FIG. 5, flexible servocontrol is effected in a manner such that a position gain Kp and a proportional gain K2 of a speed control loop are lowered in accordance with a set degree of flexibility, and the output of an integrator of the speed control loop is limited to a set clamp value. Thereupon, a torque command will not command an extremely large value even though the positional deviation increases, so that the driven body, which is driven by the servomotor, can be moved manually.

According to the conventional flexible servocontrol method described above, however, the specification of the degree of flexibility is for the servo system incorporated in each of axes (three axes and those around them) of the motor of the robot for driving the driven body, such as the robot arm, and is not on the working coordinates for actually driving the robot arm or other driven body. Thus, in specifying the degree of flexibility of the driven body, such as the robot arm, by the conventional flexible servocontrol method, it is necessary to reduce the position gain and the proportional gain of the speed control loop in accordance with the set degree of flexibility, with respect to the servo system incorporated in each axis of the motor for driving the driven body, while estimating the state of movement of the driven body on the working coordinates, e.g., x, y and z coordinates, for normal operation.

Since the operation for each axis relates to the operations for other axes, actually it is difficult to set the degree of flexibility on the working coordinates by adjusting the flexibility of the servo system incorporated in each axis of the motor.

DISCLOSURE OF THE INVENTION

The object of the present invention is to provide a flexible servocontrol method capable of modifying gains for a servo system of a robot incorporated in each axis by specifying a degree of flexibility on working coordinates.

A method according to the present invention is a control method for a servomotor which is controlled by means of a control system with a position control loop and a speed control loop, in which the degree of flexibility specified on working coordinates, on which the servomotor is situated, is converted into servo gains for individual axes of the servomotor, and the servomotor is driven in accordance with the degree of flexibility specified by means of the converted servo gains, whereby a driven body can be moved manually, and the degree of flexibility can be specified on the working coordinates.

Further, the degree of flexibility can be specified on the working coordinates on which the servomotor is situated by specifying spring constants for the directions of axes of the working coordinates and directions around the same.

Furthermore, the servo gains for the individual axes of the servomotor can be specified on the basis of position control loop gains and speed control loop gains for the individual axes of the servomotor.

The working coordinates for specifying the degree of flexibility according to the present invention constitute a coordinate system on which a robot or driven body exists and moves, and may be x, y and z coordinates. The degree of flexibility specified on the working coordinates may be spring constants for the x, y and z coordinate directions and spring constants of moments around axes of the coordinates. Moreover, the servo gains for the individual axes of the servomotor represent degrees of flexibility for the individual axes.

BRIEF DESCRIPTION OF THE DRAWINGS

FIGS. 4(a) and 4(b) are diagrams for illustrating a state of a position loop based on position feedback on the working coordinate system and the servocontrol system.

BEST MODE OF CARRYING OUT THE INVENTION

Figure 1:
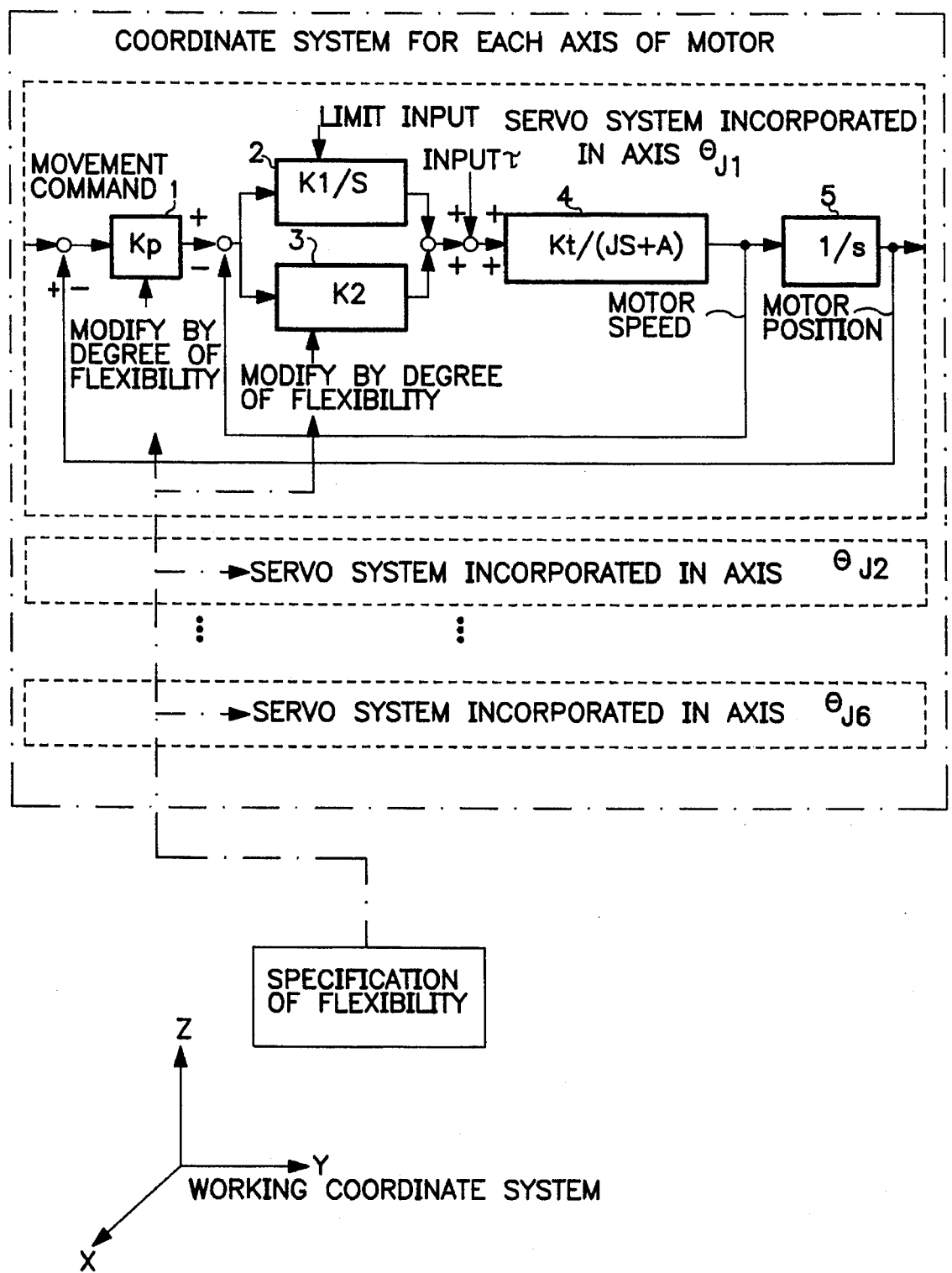
FIG. 1 is a block diagram of a servocontrol system for carrying out a flexible servocontrol method capable of specifying the degree of flexibility on working coordinates according to the present invention.
Figure 5:
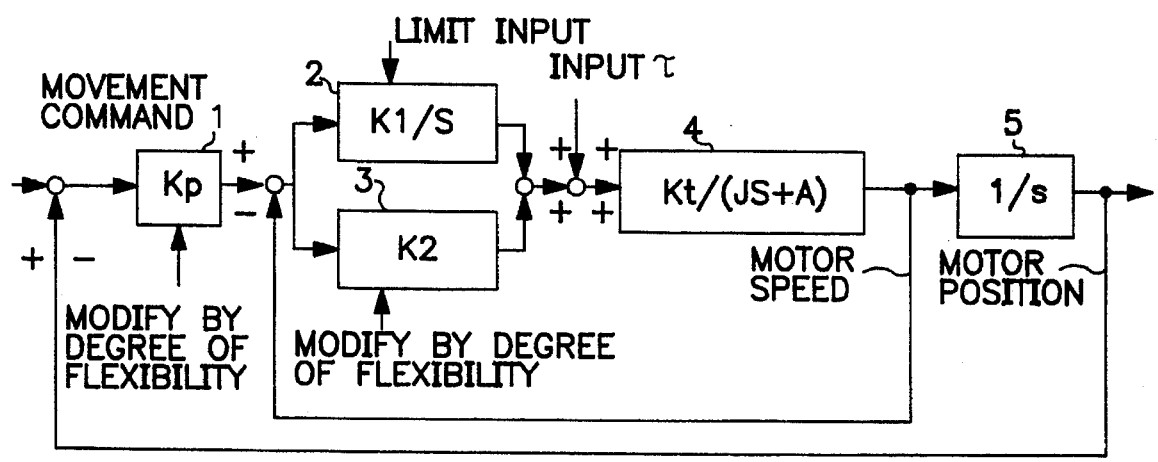
FIG. 5 is a block diagram of a servo system used in a conventional flexible servocontrol method.

FIG. 1 is a block diagram of a servocontrol system for carrying out a flexible servocontrol method capable of specifying the degree of flexibility on working coordinates according to the present invention. This system differs from the conventional servocontrol system shown in FIG. 5 in that a position gain Kp of a position control loop and a proportional gain K2 of a speed control loop in the servocontrol system incorporated in each axis are modified in accordance with the degree of flexibility of flexible control specified on a working coordinate system.

When the degree of flexibility of the flexible control is specified on the working coordinate system, in the flexible servocontrol method according to the present invention, the specified degree of flexibility is converted into a degree of flexibility for the servocontrol system incorporated in each axis of a motor, and the position gain Kp of the position control loop and the proportional gain K2 of the speed control loop for each axis are modified.

When the position gain Kp of the position control loop and the proportional gain K2 of the speed control loop in the servo control system incorporated in each axis are modified, the position gain takes a value smaller than that of the conventional position gain, depending on the degree of flexibility, in the same manner as in the conventional flexible servocontrol method, so that a speed command obtained by multiplying a positional deviation by the gain Kp is also smaller than that in the conventional control. Accordingly, a speed deviation being of the difference between this speed command and the motor speed is also smaller than that in the conventional case. Since the proportional gain K2 of the speed control loop is also modified into a value smaller than the conventional one, an output value from a proportional term 3 is also smaller than the conventional one. The output of an integrator 2 of the speed control loop is also limited to a clamp value, a torque command Tc cannot take a larger value, and a driven body which is conventionally driven by the servomotor can be moved even by a human power τ.

Figure 2:
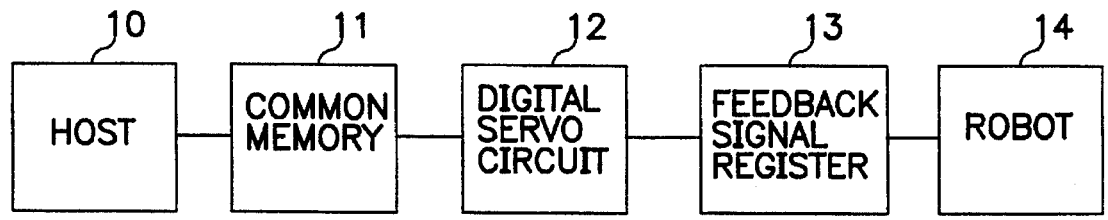
FIG. 2 is a block diagram of a robot control system for carrying out one embodiment of the present invention.

FIG. 2 is a block diagram of a robot control system for carrying out one embodiment of the present invention.

In FIG. 2, numeral 10 denotes a host computer for controlling a robot, and 11 denotes a common memory for delivering a movement command and control signals outputted from this host computer to a processor of a digital servo circuit, which will be described later, and, on the other hand, delivering various signals from the processor of the digital servo circuit to the host computer. Further, numeral 12 denotes the digital servo (software servo) circuit for executing the aforesaid servocontrol, which comprises the processor (CPU), memories such as ROM and RAM, etc. Numeral 13 denotes a feedback register which is loaded with position feedback values, speed feedback values, current feedback values, etc., for individual servomotors in the robot 14.

Described in the following is the procedure for obtaining the position loop gain (position gain) Kp and speed loop gain (proportional gain K2×torque constant Kt) Kv for each axis of the motor by converting the degree of flexibility specified for the flexible control on the working coordinate system into the degree of flexibility on the servocontrol system incorporated in each axis, in employing the flexible servocontrol method according to the present invention, in which the degree of flexibility can be specified on working coordinates.

Figure 3:
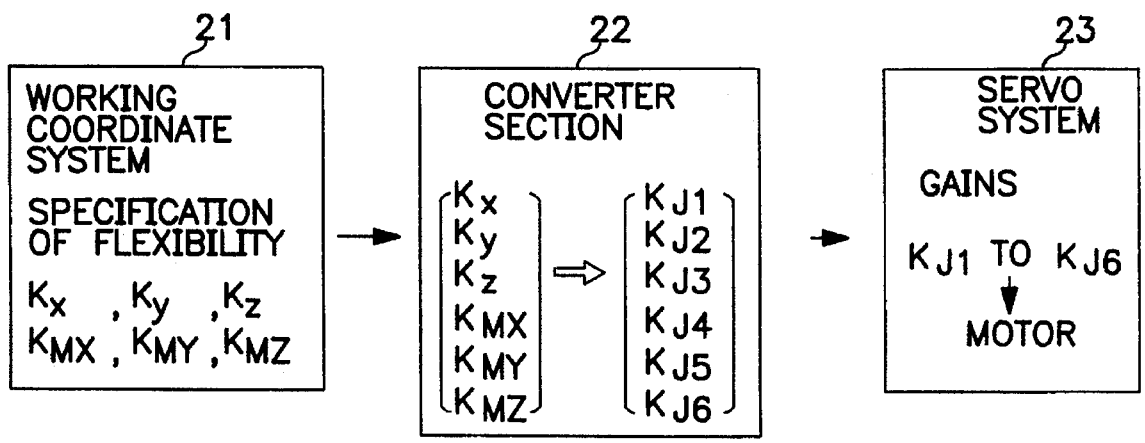
FIG. 3 is a diagram for illustrating an outline of conversion of a working coordinate system into a servocontrol system incorporated in each axis of a motor.

FIG. 3 is a diagram for illustrating an outline of conversion of a coordinate system from the working coordinate system to the servocontrol system incorporated in each axis of the motor. In FIG. 3, numeral 21 denotes a working coordinate system including, e.g., x-, y- and z- coordinates used for normal operation; numeral 23 denotes a servocontrol system which includes, for example, six axes including three axes of the motor and others around them; and numeral 22 denotes a converter section which conceptually illustrates conversion of gains from gains for specifying the degree of flexibility on the working coordinate system 21 into gains for specifying the degree of flexibility in the servocontrol system 23.

The servocontrol system 23, as described in connection with the conventional flexible servocontrol, specifies gains $K_{J1}$ to $K_{J6}$ in accordance with the degree of flexibility, and controls the motor by these gains, where the gains $K_{J1}$ to $K_{J6}$ are the gains for the servocontrol system incorporated in each of the axes (six axes) of the motor.

On the other hand, the working coordinate system is a coordinate system used to carry out normal operation. If this coordinate system includes the x-, y- and z-coordinates, the degree of flexibility is specified by specifying gains $K_x$, $K_y$, $K_z$, $K_{MX}$, $K_{MY}$ and $K_{MZ}$ respectively. The gains $K_x$, $K_y$ and $K_z$ are spring constants for the x-, y-, and z-axis directions respectively, while the gains $K_{MX}$, $K_{MY}$ and $K_{MZ}$ are spring constants of moments around the x-axis, y-axis, and z-axis respectively.

Conventionally, on the working coordinate system 21, the degree of flexibility can be specified using the gains $K_x$, $K_y$, $K_z$, $K_{MX}$, $K_{MY}$ and $K_{MZ}$; however, it is difficult for the gains $K_{J1}$ to $K_{J6}$ for the servocontrol system to be specified directly on the working coordinate system 21. According to the present invention, therefore, the gains $K_x$, $K_y$, $K_z$, $K_{MX}$, $K_{MY}$ and $K_{MZ}$ corresponding to the degrees of flexibility specified on the working coordinate system 21 are converted into the gains $K_{J1}$ to $K_{J6}$ for the servocontrol system 23, and the motor is controlled using the gains $K_{J1}$ to $K_{J6}$.

Referring now to FIGS. 4(a) and 4(b), the gains K for each of these systems will be described. FIGS. 4(a) and 4(b) are diagrams for illustrating a state of a position loop based on position feedback on each of the working coordinate system and the servocontrol system. FIG. 4(a) shows the working coordinate system, and FIG. 4(b) shows the servocontrol system.

In the working coordinate system of FIG. 4(a), position loops for the directions of the x-axis, y-axis, and z-axis and around them result in the following equations.

$$K_x(x_{cod}-x_{fb})=F_x, \quad (1)$$

$$K_y(y_{cod}-y_{fb})=F_y, \quad (2)$$

$$K_z(z_{cod}-z_{fb})=F_z, \quad (3)$$

$$K_{MX}(\theta_{xcod}-\theta_{xfb})=M_x, \quad (4)$$

$$K_{MY}(\theta_{ycod}-\theta_{yfb})=M_y, \quad (5)$$

$$K_{MZ}(\theta_{zcod}-\theta_{zfb})=M_z, \quad (6)$$

In the above equations, $K_x$, $K_y$ and $K_z$ are spring constants for the directions of the individual axes on the working coordinates; $K_{MX}$, $K_{MY}$ and $K_{MZ}$ are spring constants of moments around the individual axes on the working coordinates; $x_{cod}$, $y_{cod}$, $z_{cod}$, $\theta_{xcod}$, $\theta_{ycod}$ and $\theta_{zcod}$ are command positions on the working coordinates; $x_{fb}$, $y_{fb}$, $z_{fb}$, $\theta_{xfb}$, $\theta_{yfb}$ and $\theta_{zfb}$ are feedbacks on the working coordinates; Fx, $F_y$ and $F_z$ are forces in the directions of the individual axes on the working coordinates; and Mx, $M_y$ and $M_z$ are moments around the axial directions of the individual axes on the working coordinates.

For example, equation (1), among equations (1) to (6) described above, implies that a movement of $x_{fb}$ in the x-axis direction from a standstill state ($x_{cod}$=0) requires the force Fx. The magnitude of the force Fx can be modified by changing the spring constant $K_x$.

The following are equations for position loops obtained for the individual axes (six axes) of the motor in the servocontrol system of FIG. 4(b). Here the individual axes of the motor are represented by J1 to J6.

$$K_{J1}(\theta_{J1cod}-\theta_{J1fb})=T_{J1}, \quad (7)$$

$$K_{J2}(\theta_{J2cod}-\theta_{J2fb})=T_{J2}, \quad (8)$$

$$K_{J3}(\theta_{J3cod}-\theta_{J3fb})=T_{J3}, \quad (9)$$

$$K_{J4}(\theta_{J4cod}-\theta_{J4fb})=T_{J4}, \quad (10)$$

$$K_{J5}(\theta_{J5cod}-\theta_{J5fb})=T_{J5}, \quad (11)$$

$$K_{J6}(\theta_{J6cod}-\theta_{J6fb})=T_{J6}. \quad (12)$$

In the above equations, $K_{J1}$ to $K_{J6}$ indicating gains are spring constants representing the degree of flexibility of the motor for the individual axes in the servocontrol system; $\theta_{J1cod}$ to $\theta_{J6cod}$ are command positions for the individual axes in the servocontrol system; $\theta_{J1fb}$ to $\theta_{J6fb}$ are feedbacks in the servocontrol system; and $T_{J1}$ to $T_{J6}$ are moments for the servocontrol system.

For example, equation (7), among equations (7) to (12) described above, implies that a rotation of $\theta_{J1fb}$ in the direction of each axis from a standstill state ($\theta_{J1cod}$=0) requires the torque $T_{J1}$. The magnitude of the torque $T_{J1}$ can be modified by changing the gain $K_{J1}$.

It is difficult for the spring constants $K_x$, $K_y$ and $K_z$ for the directions of the individual axes and the spring constants $K_{MX}$, $K_{MY}$ and $K_{MZ}$ for the moments around the individual axes to be specified directly on the working coordinates, in equations (1) to (6). In the flexible servocontrol method according to the present invention, therefore, the spring constants $K_x$, $K_y$ and $K_z$ for the directions of the individual axes on the working coordinates and the spring constants $K_{MX}$, $K_{MY}$ and $K_{MZ}$ for the moments around the individual axes on the working coordinates, in equations (1) to (6), are controlled to specified values by changing the gains $K_{J1}$ to $K_{J6}$ in equations (7) to (12), which represent the degree of flexibility of the motor for the individual axes in the servocontrol system.

Then, equations (1) to (6) are rewritten on coordinates for the individual axes of the servocontrol system, and a relational expression for converting the gains $K_x$, $K_y$, $K_z$, $K_{MX}$, $K_{MY}$ and $K_{MZ}$ into the gains $K_{J1}$ to $K_{J6}$ is obtained.

In general, the data on the individual axes $\theta$ can be converted into the data on the x-axis, y-axis, and z-axes and others around these axes by means of sequential conversion f. According to this sequential conversion f, $x_{cod}$, $y_{cod}$, $z_{cod}$, $\theta_{xcod}$, $\theta_{ycod}$ and $\theta_{zcod}$ in equations (1) to (6) are represented by the following equation:

$$f(\theta_{J1cod}, \ldots, \theta_{J6cod}) = \begin{pmatrix} x_{cod} \\ y_{cod} \\ z_{cod} \\ \theta_{xcod} \\ \theta_{ycod} \\ \theta_{zcod} \end{pmatrix}, \quad (13)$$

where $\theta_{J1cod}$ to $\theta_{J6cod}$ of equations (7) to (12) are used.

It is generally known that with the relationship among the moments $T_{J1}$ to $T_{J6}$ for the individual axes, the forces $F_x$, $F_y$, $F_z$ for the directions of individual axes of the working coordinates can be expressed by the following equation (14) where Jacobian J is used with respect to the force.

$$\begin{pmatrix} T_{J1} \\ T_{J2} \\ T_{J3} \\ T_{J4} \\ T_{J5} \\ T_{J6} \end{pmatrix} = J_T \begin{pmatrix} F_x \\ F_y \\ F_z \\ M_x \\ M_y \\ M_z \end{pmatrix}. \quad (14)$$

Where $J^T$ in this represents a Jacobian transposition.

Rewriting equations (1) to (6) based on equations (13) and (14) given above, we obtain diag$[K_x, K_y, K_z, K_{MX}, K_{MY}, K_{MZ}] \cdot [f(\theta_{J1cod}, \ldots, \theta_{J6cod}) - f(\theta_{J1fb}, \ldots, \theta_{J6fb})]$ $$\begin{aligned}
\text{diag}[K_x, K_y, K_{MX}, K_{MY}, K_{MZ}] \cdot & \\
[f(\theta_{J1cod}, \ldots, \theta_{J6cod}) - f(\theta_{J1fb}, \ldots, \theta_{J6fb})] & = \begin{pmatrix} F_x \\ F_y \\ F_z \\ M_x \\ M_y \\ M_z \end{pmatrix} = (J^T)^{-1} \begin{pmatrix} T_{J1} \\ T_{J2} \\ T_{J3} \\ T_{J4} \\ T_{J5} \\ T_{J6} \end{pmatrix} \\
& = (J^T)^{-1} \{\text{diag}[K_{J1}, \ldots, K_{J6}] \cdot \begin{pmatrix} (\theta_{J1cod} - \theta_{J1fb}) \\ (\theta_{J2cod} - \theta_{J2fb}) \\ (\theta_{J3cod} - \theta_{J3fb}) \\ (\theta_{J4cod} - \theta_{J4fb}) \\ (\theta_{J5cod} - \theta_{J5fb}) \\ (\theta_{J6cod} - \theta_{J6fb}) \end{pmatrix}.
\end{aligned} \quad (15)$$

Where diag$[\lambda_1, \lambda_2]$ is a diagonal matrix having $\lambda_1$ and $\lambda_2$ as its diagonal elements.

Rewriting the above equation (15), we obtain $$J^T \cdot \text{diag}[K_x, K_y, K_z, K_{MX}, K_{MY}, K_{MZ}] \cdot [f(\theta_{J1cod}, \ldots \theta_{J6cod}) - f(\theta_{J1fb}, \ldots, \theta_{J6fb})] = \text{diag}[K_{J1}, \ldots, K_{J6}] \cdot \begin{pmatrix} \text{Error } \theta_{J1} \\ \text{Error } \theta_{J2} \\ \text{Error } \theta_{J3} \\ \text{Error}\theta_{J4} \\ \text{Error}\theta_{J5} \\ \text{Error } \theta_{J6} \end{pmatrix}. \quad (16)$$

Error $\theta_J$ represents the error $(\theta_{Jcod} - \theta_{Jfb})$ between $\theta_{Jcod}$ and $\theta_{Jfb}$.

In the above equation (16), $K_x$, $K_y$, $K_z$, $K_{MX}$, $K_{MY}$ and $K_{MZ}$ are set values which are to be set in specifying the degree of flexibility on the working coordinates; $f(\theta_{J1cod} - \theta_{J6cod})$ are command values to be inputted on the working coordinates; $f(\theta_{J1fb} - \theta_{J6fb})$ are detected values on the working coordinates; and Errors $\theta_{J1}$ to $\theta_{J6}$ are error values stored in an error register. Therefore, the gains $K_{J1}$ to $K_{J6}$ on the individual axes can be obtained as functions having these known values.

Thus, solving the equation (16) for the gains $K_{J1}$ to $K_{J6}$ on the individual axes, the degree of flexibility specified on the working coordinates is inputted through an on-line system or the like; and the values of the gains $K_{J1}$ to $K_{J6}$ are modified with every period by the CPU so that flexible servocontrol can be made available by providing the control using the modified values.

Furthermore, this gain $K_J$ can be determined based on the reference flexibility, which has been predetermined, for example, in the servocontrol system. Since the gain $K_J$ can be represented by the product of the position loop gain (position gain) Kp and the speed loop gain Kv (proportional gain K2×torque constant Kt), the gain $K_J$ can be specified by individually setting the position loop gain Kp and the speed loop gain Kv.

If the gain $K_J$ in the case where the degree of flexibility is 0% (adequately solid) is represented by $K_J(0\%)$, and if the position loop gain Kp and the speed loop gain Kv in this case are represented by Kp(0%) and Kv(0%), respectively, the gain $K_J$ can be expressed by the two loop gains, the position loop gain Kp and the speed loop gain Kv, as followed respectively.

$$Kp = Kp\ (0\%) \times (K_J/K_J\ (0\%))^{1/2}, \quad (17)$$

$$Kv = Kv\ (0\%) \times (K_J/K_J\ (0\%))^{1/2}, \quad (18)$$

Thereupon, in the flexible servocontrol method according to the present invention which enables the degree of flexibility to be specified on the working coordinates, the processor of the digital servo circuit 12 in this robot control system executes the flexible servocontrol processing, based on the position loop gain (position gain) Kp and the speed loop gain (proportional gain Kz×torque constant Kt) Kv for the individual axes, which are obtained by converting the degree of flexibility specified on the working coordinates into the degree of flexibility in terms of the degree of flexibility of the servocontrol system incorporated into the the motors of individual axes.

A flexible control command and the degree of flexibility may be manually inputted by an operator, or regions for flexible control may previously be specified by the programs.

When the operation of the robot is started, the processor of the digital servo circuit 12 changes the control mode from normal control to the flexible control in accordance with the flexible control command, and executes processing for the flexible control with every position/speed loop processing period. Then, the processor reads out $K_x$, $K_y$, $K_z$, $K_{MX}$, $K_{MY}$ and $K_{MZ}$, which respectively represent the degrees of flexibility on the working coordinate system and previously stored in the common memory or the like. Based on these data, the gains $K_{J1}$ to $K_{J6}$ are calculated and updated in the form of, e.g., position loop gains $Kp_{J1}$ to $Kp_{J6}$ and speed loop gains $Kv_{J1}$ to $Kv_{J6}$ by the above-described flexible control method according to the present invention, and are stored again in the common memory or the like. The digital servo circuit reads out the updated gains $K_{J1}$ to $K_{J6}$ (position loop gains $Kp_{J1}$ to $Kp_{J6}$ and speed loop gains $Kv_{J1}$ to $Kv_{J6}$) from the common memory, and controls the motor in accordance with these data.

In consequence, a torque outputted by the servomotor is reduced to a smaller value, and so it becomes possible for the operator to manually move an arm of the robot, which has been controlled by the servomotor, to any desired position in this flexible control state. Thus, if the accuracy of a workpiece is so poor that a mounting position and the actual position of the workpiece transported by the robot arm do not agree with each other in the process of mounting the workpiece on a machine tool or the like, the robot arm can be manually moved to locate the workpiece in the mounting position.

According to the embodiment of the present invention, as an effect, the servocontrol system can be stabilized by individually setting the position loop gain Kp and the speed loop gain Kv to set the gain $K_J$.

According to the present invention, as described above, a flexible servocontrol method is made available in which the gains for the servo systems of the robot incorporated in the individual axes can be modified by setting the degree of flexibility on the working coordinates.

We claim:

1. A flexible servocontrol method of a servomotor which drives a body, the servomotor being controlled by a control system including a position control loop and a speed control loop, the flexible servocontrol method comprising the steps of:

specifying the degrees of flexibility on a working coordinate system of the body;

converting the degrees of flexibility specified on the working coordinate system into servo gains with respect to individual axes of the servo motor; and driving the servo motor according to the converted gains so that the body which is normally driven by the servo motor can be moved manually.

2. The flexible servocontrol method according to claim 1, wherein the degrees of flexibility specified on the working coordinate system on which the servo motor is located are spring constants for directions of axes of the working coordinate system and movements around the directions of axes of the working coordinate system.

3. The flexible servocontrol method according to claim 2, wherein said servo gains for the individual axes of the servomotor are position control loop gains and speed control loop gains for the individual axes of said servomotor.

4. The flexible servocontrol method according to claim 1, wherein said servo gains for the individual axes of the servomotor are position control loop gains and speed control loop gains for the individual axes of said servomotor.

* * * * *

UNITED STATES PATENT AND TRADEMARK OFFICE
CERTIFICATE OF CORRECTION

PATENT NO. : 5,587,638
DATED : December 24, 1996
INVENTOR(S) : Tetsuaki KATO, et al.

It is certified that error appears in the above-indentified patent and that said Letters Patent is hereby corrected as shown below:

<u>Column 6</u>

Line 26, after "this", insert --instance--;

Delete lines 30 and 31 in their entirety;

In Equation (15), after "$K_y$", insert --$K_z,$--.

Signed and Sealed this

Fourth Day of March, 1997

BRUCE LEHMAN

Attest:

Attesting Officer

Commissioner of Patents and Trademarks